United States Patent [19]
Lee et al.

[11] Patent Number: 5,401,564
[45] Date of Patent: Mar. 28, 1995

[54] MATERIALS AND PROCESSES FOR FABRICATING FORMED COMPOSITE ARTICLES AND USE IN SHOE ARCH

[75] Inventors: Frank F. W. Lee, Danville; Thomas K. Owen, San Jose; William J. Swanson, Livermore; James R. Watts, Manteca; Susan M. Brinkerhoff, Martinez, all of Calif.

[73] Assignee: Hexcel Corporation, Pleasanton, Calif.

[21] Appl. No.: 36,182

[22] Filed: Mar. 23, 1993

[51] Int. Cl.⁶ .................. B32B 17/02; A43B 13/38; B28B 5/00
[52] U.S. Cl. .................. 428/228; 428/113; 428/175; 428/212; 428/244; 428/245; 428/246; 428/257; 428/261; 428/273; 428/285; 428/289; 428/365; 264/103; 264/134; 264/241; 264/257; 264/258; 264/324; 36/30 R; 36/44; 36/91
[58] Field of Search ............ 428/175, 228, 107, 113, 428/212, 225, 236, 244, 245, 246, 257, 261, 268, 273, 284, 285, 289, 365; 36/30 R, 88, 91, 145; 264/510, 103, 134, 241, 257, 258, 319, 324

[56] References Cited

U.S. PATENT DOCUMENTS

| | | | |
|---|---|---|---|
| 2,653,396 | 9/1953 | Gottlieb et al. | 36/71 |
| 4,241,124 | 12/1980 | Kremer et al. | 428/156 |
| 4,439,934 | 4/1984 | Brown | 36/44 |
| 4,520,581 | 6/1985 | Irwin et al. | 36/88 |
| 4,610,101 | 9/1986 | Brown | 36/44 |
| 4,611,413 | 9/1986 | Brown | 36/44 |
| 4,612,713 | 9/1986 | Brown | 36/44 |
| 4,668,338 | 5/1987 | Maydane et al. | 156/643 |
| 4,686,994 | 8/1987 | Harr et al. | 128/586 |
| 4,688,338 | 9/1987 | Brown | 36/44 |
| 4,778,717 | 10/1988 | Fitchmun | 428/246 |
| 4,881,329 | 11/1989 | Crowley | 36/38 |
| 4,931,345 | 6/1990 | Böttger et al. | 428/116 |
| 5,087,193 | 2/1992 | Herbert, Jr. | 425/543 |

Primary Examiner—Donald J. Loney
Attorney, Agent, or Firm—Poms, Smith, Lande & Rose

[57] ABSTRACT

A strong, lightweight composite material having beneficial flexing characteristics is made using a unique reinforcement material. The reinforcement material comprises a fabric incorporating glass rovings with graphite tows in an architectural combination that retains the properties of both materials. Composite structures made using this reinforcement material with a thermosetting or thermoplastic matrix are extremely lightweight, with desirable anisotropic flexing properties. The finished composite structure is extremely useful as an arch support in a shoe to absorb and distribute the forces generated by walking. In distributing forces on the foot such a support will provide the desired stiffness along the longitudinal axis while allowing increased flexibility along the transverse axis.

30 Claims, 3 Drawing Sheets

MATERIALS AND PROCESSES FOR FABRICATING FORMED COMPOSITE ARTICLES AND USE IN SHOE ARCH

BACKGROUND OF THE INVENTION

1. Field of The Invention

The present invention relates to thermoplastic or thermosetting resin composite material incorporating an improved reinforcement fabric. More particularly, the invention relates to the use of an improved glass and graphite composite reinforcement to impart anisotropic properties a shaped composite structure. The resulting composite structure, such as an arch support for a shoe, is strong, lightweight and resilient with improved flexing properties.

2. Description of Related Art

During the past several years many researchers working with structural materials have focused on developing strong lightweight articles that are durable, cost effective and easy to fabricate. Such materials would be in great demand for applications ranging from aircraft construction to athletic equipment. For example, structural materials having high durability and significant strength to weight ratios are necessary for many advanced aerospace applications. Similarly, low weight resilient materials with shock absorbing flexibility are continually in demand for fabricating equipment and structural supports. Traditional fabrication materials such as metal alloys and plastics have not proved satisfactory in providing the desired combination of properties. For instance, if acrylics or other plastics are used to form articles they must sacrifice low weight and flexibility in order to achieve the strength necessary for many applications.

The search for substances having these desirable properties has resulted in the extensive development of composite materials. Composite materials are materials in which two or more distinct substances such as metals, glass, ceramics, or polymers are combined, with or without chemical reaction, to produce a material with structural or functional characteristics different from the individual constituents. The constituents retain their individual characteristics and are distinguishable on a microscopic scale. Typically one constituent is classified as the reinforcement and the other as the matrix. The reinforcement provides the strength or stiffness in the composite. The matrix binds the reinforcement together and contributes to the distribution of the load.

To a greater or lesser extent composite materials usually require relatively more effort for their fabrication. Yet despite the complications inherent in their preparation, composite materials represent an interesting alternative to metals whenever there is a demand for great strength with minimal weight. Other than metal alloys, this is only attainable with materials having high tensile strength and low density.

Classes of materials commonly used for reinforcements are glasses, metals, polymers, ceramics and graphite. The reinforcement can be in many forms, such as continuous fibers or filaments, chopped fibers, woven fibers, particles or ribbons. The criteria for selecting the type and form of reinforcement will vary in accordance with the design requirement for the composite. However, criteria for a generally desirable reinforcement include high strength, high modulus, low weight, low cost, ease of fabrication and environmental resistance. The properties of the composite material are derived from matrix characteristics in combination with the inherent properties of the reinforcement material along with the form and amount of reinforcement used. Composite materials typically incorporate several layers or laminae of reinforcing material into a composite structure or laminate.

The prior art contains numerous examples of different materials having these criteria to a greater or lesser extent being employed as reinforcements in composite structures. Those reinforcement materials which have generally favorable properties confer elastic rigidity, tensile and fatigue strength, as well as appropriate electrical and magnetic properties to the resulting composite. The basic problem with current composite reinforcement materials is that they fail to provide all the desired attributes simultaneously. Thus the properties of impact absorption, variable flexibility, ease of fabrication, cost and durability are often mutually exclusive in existing composite materials.

Though an endless number of reinforcement materials may be employed to satisfy different structural or functional requirements, relatively few are extensively used. Due to their low cost and reproducibly good properties, glass fibers have become one of the principal reinforcement materials in use today. The glass fibers are prepared by melting raw materials and extruding the molten glass to yield an amorphous, anisotropic product. Along with their low cost, glass fibers generally have a high strength to weight ratio but their moduli are significantly lower than those of most other high performance fibers. Therefore they may be used to fabricate materials which are relatively flexible. Several types of specialized glass with selected properties have been developed for use in composite materials. Of the glass fibers typically found in reinforcing materials, E-glass is the most common grade and has the lowest cost per unit.

Carbon fibers are currently the predominant high strength, high modulus reinforcing fiber used in the manufacture of advanced composite materials. Production methodology can increase the extent of crystallite orientation parallel to the carbon fiber axis and thus increase the fiber modulus. Because of the high degree of internal structure orientation, the graphite fibers are strongly anisotropic. Their transverse tensile strength and sheer moduli are usually an order of magnitude lower than the axis modulus. Although carbon fibers have been produced with diameters in excess of 25 $\mu$m, most fibers are on the order of 6–8 $\mu$m in diameter. With such small sizes the carbon filaments must be handled as tows rather than individual microfilaments. Commercially available tows contain anywhere from 1,000 to 60,000 fibers per yarn.

As indicated previously a lamina is defined as one layer or ply of reinforcement material embedded in the matrix. The properties of each lamina are determined by the properties of its constituents as well as the form, orientation and amount of reinforcement used. In general laminae employing long continuous fibers running parallel to each other are stronger than those using short, randomly oriented fibers. Such laminae are anisotropic in that they are stronger and stiffer along the longitudinal axis running parallel to the fibers than the transverse axis running perpendicular to the fibers. In addition, laminae incorporating woven reinforcements are generally stronger along the transverse axis than those with unwoven parallel fiber reinforcements.

The prior art teaches that the laminae may be combined to form laminate structures having properties determined by the orientation of the reinforcement material in the laminae. To compensate for the low transverse properties of the unidirectional material, laminae may be cross plied so the fibers are angled relative to each other. This tends to give structures with improved transverse properties but at the expense of poorer longitudinal properties. Furthermore the in-plane shear strength is not significantly improved over that of unidirectional structures. Thus if the laminate is not constructed so it is balanced and symmetric, it will twist or bend when in-plane loads are applied. The laminate may also extend or contract when bending loads are applied.

Despite these limitations, thermosetting laminate materials have long been used to provide complex shapes in articles of manufacture. For example U.S. Pat. No. 4,439,934 discloses the use of layered materials to form a laminate orthotic insert. The manufacturing process consists of laboriously combining layers of fibers at different angles to provide the strength and flexibility required by the article. Labor intensive, this fabrication method is highly susceptible to manufacturing defects. Construction of the layered article is done on a cast and the whole combination is thermally set to fix the configuration. The resulting insert is relatively thick and heavy with little flexibility for the comfort of the user.

Another example of using a multilayer laminate system may be found in U.S. Pat. No. 4,688,338. This patent teaches a laminated structure providing a greater resistance to bending moments along the longitudinal axis and less resistance to bending along the transverse axis. Yet these beneficial properties are imparted by the interaction of separate, resin impregnated laminae having parallel reinforcement fibers embedded in the matrix. The anisotropic flexibility is imposed solely through the interaction of different layers having the parallel reinforcement fibers oriented at specific angles relative to each other. There is no teaching that one lamina could retain this anisotropic flexibility through the use of a fabric reinforcement layer.

In addition to the reinforcement materials, the other major component of any composite material is the matrix. The matrix binds the reinforcement together and enhances the distribution of the applied load within the composite. Polymeric materials are widely used as matrix materials. The two general types of polymers which are generally employed in composite materials may be classified as thermosetting and thermoplastic. The principal differences between them is the degree of cross-linking and response to elevated temperature. Thermosetting resins or polymers are extensively crosslinked and undergo irreversible changes when heated or reacted with a selected catalyst or a curing agent. In contrast thermoplastic materials are generally not crosslinked and soften as they are heated. After being exposed to heat they return to their original condition when cooled below their melt temperature.

Thermosetting resins or thermosets are those resins which, in the presence of a catalyst, heat radiation and/or pressure undergo an irreversible chemical reaction or cure. Prior to cure, thermosets may be liquid or made to flow under pressure and heat to any desired form. Once cured they cannot be returned to the uncured state and can no longer flow. One of the most common types of thermosetting materials are epoxy resins which are characterized by the presence of a three membered cyclic ether root commonly referred to as an epoxy group, 1,2-epoxide or oxirane. They have gained wide acceptance in composite materials because of their exceptional combination of properties such as toughness, adhesion, chemical resistance, and superior electrical characteristics. When combined with their relative ease of handling and processing as well as low unit cost, they make up the single most important matrix material.

In general epoxy resins can be cured by reaction with suitable, polyfunctional curing agents such as amines. The qualities of the curing agents in polymerization are governed by the structure and choice of components. For example, aliphatic amines allow ambient temperature curing whereas slow reacting, aromatic amines, require a higher temperature to cure. By varying and combining these curing agents, favorable production properties can be realized.

Thermoplastic systems have advantages over some of the thermosets in that no chemical reactions which cause release of gas products or excess thermal heat are involved. Processing is limited only by the time needed to heat, shape, and cool the structure. In addition they are generally more ductile and tougher than thermosets. On the other hand solvent resistance and heat resistance are not likely to be as good as with thermosets. Common thermoplastic materials include polyolefins, vinyls, polyamides, acrylics, polyesters, and polysulfones.

There are many processes for the fabrication of both thermosetting and thermoplastic composites. Such processes may be generally classified as open molding and closed molding. Open molds are one piece and use low pressure while closed molds are two piece and usually involve higher pressures. Closed molding techniques include matched die molding, injection molding, and continuous laminating. Finishing of the materials generally presents no major problems; the appropriate technology is both proven and cost effective. Rather, it is the preparation of composites in suitable form that tends to be costly.

Accordingly it is an object of this invention to provide an anisotropic reinforcement fabric which may be used in the fabrication of sturdy, lightweight, flexible composite structures.

Further it is an object of this invention to provide a sturdy lightweight composite material which may be easily formed into complex shapes.

In addition it is an object of the present invention to provide a process for the fabrication of sturdy, lightweight composite articles.

In particular it is an object of the present invention to form lightweight composite arch supports for use in shoes.

SUMMARY OF THE INVENTION

The present invention provides for a graphite and glass fabric reinforced composite material which overcomes various difficulties inherent in prior art thermoplastic or thermosetting laminate materials. Specifically, the composite materials of the present invention are thin, strong, durable, and relatively light. Further, the composite structures disclosed herein have anisotropic flexibility which may be used in structure designs. For instance the composite material may be shaped to form an impact absorbing arch support for a shoe. In addition, these composite materials are inexpensively and easily fabricated into contoured structures using the process disclosed herein. The basic single ply structure may also be selectively reinforced to increase the strength of the article without greatly increasing its weight.

In general, the formed composite materials of the present invention are fabricated by: providing a reinforcement material, impregnating the reinforcement material with a suitable thermosetting or thermoplastic resin, and forming the desired composite structure with pressure and heat.

Specifically, the novel reinforcement material used is a fabric that combines glass rovings with graphite tows in an architectural combination that results in a fabric which retains the distinctive properties of the glass and the graphite. More particularly, the woven fabric is prepared having a graphite fiber warp and glass roving fill. The construction of the woven fabric contributes to a final formed composite piece that is relatively stiff in the longitudinal direction parallel to the carbon fibers while retaining the desired flexibility in the lateral direction.

The composite material may be made using either a thermosetting or thermoplastic resin to form the matrix. Preferred resins for impregnating the reinforcement material are low viscosity epoxies polyesters, polyurethanes, and acrylics which provide suitable working time and cure temperatures. However, other resins may be employed, depending on the intended use of the composite materials. Thermoplastics, which are available in film form with a melting range below 600° F. are also suitable for use in the present invention. Some of the thermoplastic materials which may be used include polycarbonates, polyetherimides, acrylics, and polyurethanes.

The shape of the finished composite piece is formed using a press molding technique with the male mold side being hard tooling such as aluminum or steel and the female side being soft tooling such as silicone or urethane sheet pressure bags. In order to mold the composite structure, strips of impregnated reinforcement material are cut corresponding to the mold width and a length equivalent to the length of an arbitrary number of ganged molds. The strip is placed between the two mold faces, pressed at the desired temperature for the desired period of time, and then removed from the mold surfaces. The final desired part is cut from the molded product using conventional methods such as water jet cutting.

Further objects, features, and advantages of the present invention will become apparent to those skilled in the art from a consideration of the following detailed description when considered in combination with the following drawings.

DETAILED DESCRIPTION OF EXEMPLARY EMBODIMENTS

Figure 1:
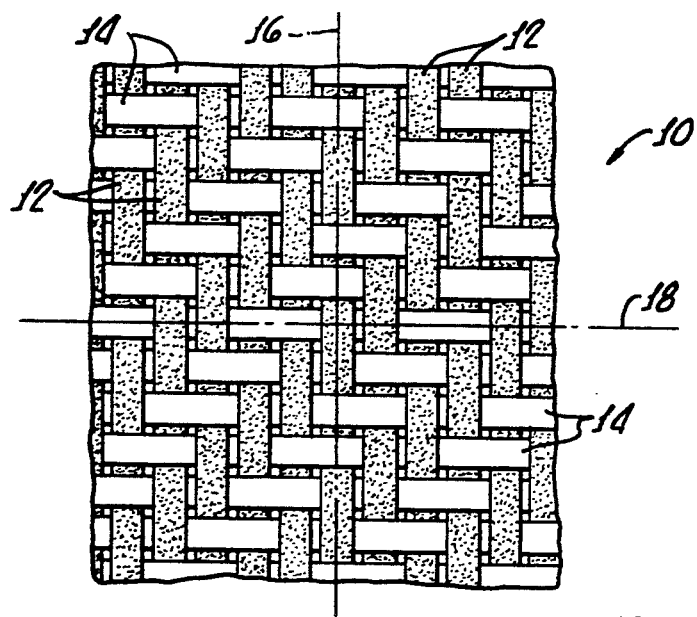
FIG. 1 is a top view of a reinforcement material according to the present invention showing a 2/2 twill weave.

The present invention involves the discovery that strong lightweight composite materials can be fabricated using a glass and graphite reinforcement fabric. In a broad aspect, the composite structures of the present invention are based upon combining the fabric reinforcement with thermosetting or thermoplastic resins to form a sheet of composite material which is then shaped to produce the desired structure.

These structures have surprising strength to weight ratios making them useful for a number of support applications. Moreover, because of the unexpected flexing characteristics imparted by the reinforcement material, the composite structures of the present invention are particularly well suited for situations where the support is subject to sudden impact. For instance the present invention would be particularly useful for the arch support of a shoe or to make an automobile dash safer in the event of an accident. While the material has inherent flexibility, those skilled in the art will appreciate that the flexibility may be altered by varying the matrix material, the amount of reinforcement used, or the orientation of the reinforcement material.

Whereas prior art efforts have been focused on improving the flexibility and strength of composite structures through the use of multiple laminae, the present invention advantageously combines these properties within a single ply structure. While it is possible that the reinforcement material of the present invention may be incorporated using a multi-ply configuration, this is not necessary to impart the beneficial flexing characteristics. Therefore, composite structures may be made lighter through the use of less material while retaining the desired flexibility and strength.

Of equal importance, the present invention accomplishes these results using materials and fabrication techniques which are relatively low in cost and compatible with modern production technology. For instance, the reinforcement fabric of the present invention is a unique combination of two less expensive components currently found in advanced composite materials. In addition, the impregnation or wetting procedures are easily adaptable to large scale production, as is the molding process. By avoiding the use of several lamina at different orientations the present invention avoids the labor intensive processes used to produce current composite structures with equivalent properties.

The present invention involves the use of a unique reinforcement material which combines glass rovings with graphite tows in an architectural combination that retains the distinctive properties of each. Specifications for a preferred embodiment of the fabric are shown in Table 1.

TABLE 1

| FIBER TYPE | |
|---|---|
| WARP | 12K GP CARBON FIBERS |
| FILL ROVING | 330 YIELD E-GLASS |
| YARN COUNT | |
| WARP (PER INCH) | 13 |
| FILL (PER INCH) | 11 |
| FABRIC AREAL WEIGHT | |

TABLE 1-continued

| G/SQ M THICKNESS | 32.1 (NOMINAL) |
|---|---|
| DRY (AMES GAUGE) | 0.034" |
| @ 60% FIBER VOL. | 0.032" |

Typically, the fabric can be manufactured using the glass rovings and graphite tows in several different weaves. The fabrics incorporated may be produced using standard equipment and techniques well known in the art. Using different weaves results in fabrics having varied anisotropic characteristics. Therefore through the use of different weaves the physical properties of the resulting reinforcement material may be configured for specific purposes. In particular the anisotropic flexibility of the resulting composite material may be altered relative to the longitudinal axis.

Figure 2:
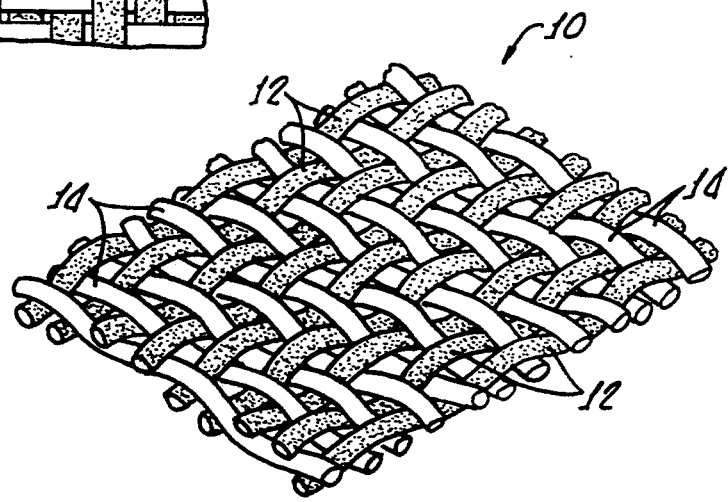
FIG. 2 is a is a perspective view of the material of FIG. 1.

Referring now to the drawings, the woven reinforcement material 10 made using a 2/2 twill weave pattern is shown in FIG. 1 with carbon tows 12 and glass rovings 14. The longitudinal axis 16 is shown running parallel with the graphite tows and the transverse axis 18 is shown running parallel to the glass rovings. FIG. 2 shows a perspective of the same material. The twill weave is characterized by diagonal lines, known as twill lines, that run at angles to the longitudinal axis and transverse axis.

Figure 8:
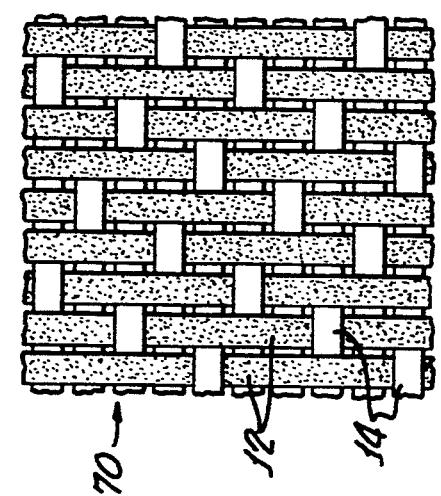
FIG. 8 is a top view of the reinforcement material of the present invention showing a satin weave.
Figure 7:
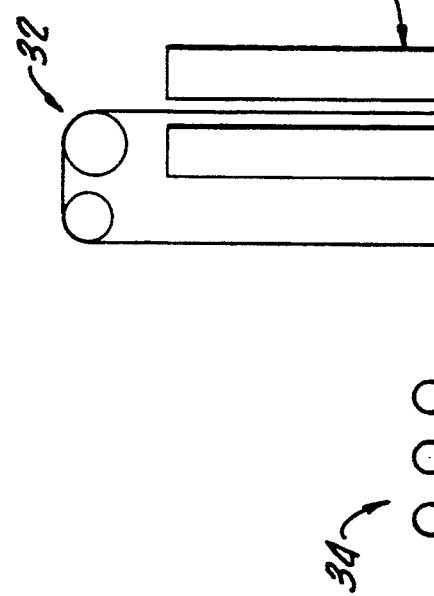
FIG. 7 is a top view of the reinforcement material of the present invention showing a plain weave.

Other embodiments of the reinforcement material may be fabricated using the same components in two other common weaves. Plain weave 60 using the glass rovings 14 and graphite tows 12 are shown in FIG. 7 and a satin weave 70 is shown in FIG. 8 again with the glass rovings 14 and graphite tows 12. A unique characteristic of the satin weave is there are no adjacent interlacements in a repeat. This produces a reinforcement material whose anisotropic properties are less defined than fabrics made from the other two weave and its flexibility is more uniform.

In a preferred embodiment the 2/2 twill fabric weave 10 has a final yarn count of 13 warp fibers 12 per inch and 11 weft fibers 14 per inch. Other fabrics which may be used in this invention may have yarn counts from 5 to 30 elements in both the weft and warp. The yarn count is a principal factor in determining the stiffness of the resulting composite materials. This specific weave and fiber content gave the embodiment a nominal weight of only 31.9 oz/yd$^2$ A single-ply of the resulting fabric had a dry thickness of 0.034 inches using an Ames gauge and only 0.032 inches at 60% fiber volume.

The anisotropic properties of the preferred embodiments may be imparted using graphite tows comprising either standard modulus carbon fibers or intermediate modulus carbon fibers. These fibers are commercially available and are sold under the names Hercules AS4C and Hercules IM-7 (Hercules Corp., Wilmington, Delaware) respectfully. Likewise the preferred 330 E-glass rovings are easily and inexpensively obtained. Among other sources, they are sold under the name Fiberglas (Owens Corning, Toledo, Ohio).

One exemplary embodiment of the present invention combines this fabric with an epoxy based polymer resin system as a matrix. This particular resin is formulated to provide a very good shelf life in addition to good out time. Even with these attributes it still has a relatively rapid cure time of two minutes at 350° F. These qualities promote high speed production capability. The catalytic system used provides a two stage cure with a large cure temperature window while still producing a good part.

The mixing of the resin formulation is initiated with the addition of diglycidyl ether of bisphenol F into a reactor having mechanical mixing blades. Polyoxyalkyleneamine was then slowly added to the reactor and mixed at a constant temperature. Bisphenol A-novolac epoxy, with an average functionality of 3, is heated in an oven at 70° C. for a few hours until it can be easily poured. The liquid is then charged into the reactor with good mixing. Carboxy terminated butadiene-acrylonitrile copolymers and carboxylated nitrile rubber solution (15% in MEK) are then added to the mixing reactor. The mixture is heated for at least 45 minutes at approximately 80° C. The batch is then cooled to about 40° C. Polyglycidyl ether of bisphenol A (80% in acetone), titanium dioxide (TiO$_2$) and antifoam (Antifoam 1400 from Dow Corning) are then added and mixed in well. The total mixture is stored in a cool area for further compounding.

Just prior to adding the matrix to the reinforcement material, acetone is charged into the above mixture to make it a 65-70% total solid mixture. The catalysts dicyandiamide and 2-ethyl-4-methylimidazole are then added and the resulting formulation is given a good mixing for 15 to 20 minutes. During this period the mixing temperature was kept below 50° C. In addition to having a good out time, this solution is found to be very stable over extended periods.

While this particular dicatalytic resin system is suitable for practicing the present invention, those skilled in the art will recognize that numerous thermosetting resin systems with and without fillers may also be used in the invention. Compatible thermosetting resin systems useful in the present invention may be based on epoxies, polyesters, polyurethanes, or acrylics. Depending on the specific physical properties sought, different formulations of epoxy resins will provide suitable matrix materials. For instance, different crosslinkers may be substituted to improve the temperature compatibility of the matrix or modify the cure window. Other possible thermosetting resin matrix systems include polyimide, bismalemide and cyanate resins. Alternatively, the use of thermoplastic resins such as polycarbonates, polyetherimides, acrylics or thermoplastic polyurethane as matrix materials are contemplated as being within the scope of the present invention.

In addition to several matrix systems described above it will be appreciated by those skilled in the art that there are several different processes which can be used to produce the combination of reinforcement material and uncured resin known as prepreg. In preferred embodiments this uncured composite material or prepreg may be stored for some time before being cured and shaped to form the desired composite structure. The wetting process used to produce the prepreg may involve drawing the reinforcement through the liquid resin while other processes spray the liquid matrix or employ a hot melt procedure. In a hot melt process the solid resins are first cast into films on release paper and later deposited on or impregnated in fabrics using slight heat and pressure. Thus, by controlling the application process, the deposition of the matrix may occur only on the surface of the reinforcement or it may be impregnated throughout. This can substantially alter the properties of the composite structures as desired.

Figure 3:
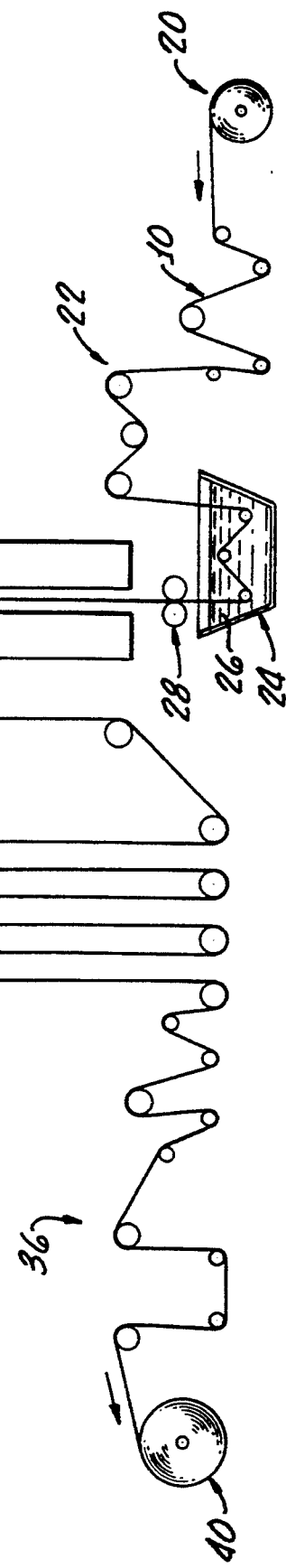
FIG. 3 is a schematic diagram showing an embodiment of an apparatus for wetting the reinforcement material with the matrix resin.

Referring now to FIG. 3, in a preferred embodiment the reinforcement material is first installed onto the fabric let-off roll 20. The liquid resin system 26 is placed into the dip pan 24 under the vertical drying ovens or towers 30. A series of rollers 10,22,36 keep the tension on the reinforcement material uniform and help keep the speed constant. Under this proper tension the fabric cloth is slowly pulled through the dip pan, and up through the drying towers. The temperature in both towers is in the range of 93° C. to 104° C. with the run speed of 6–10 feet per minute for this particular embodiment. Following the passage through the heating towers, the fabric wetted with the resin is passed over a chilled roller 32 and through an accumulator rack 34. The final product is then collected on a take-up roll 40 as shown in FIG. 3.

These processing conditions are capable of producing a prepreg with resin content in the range of 26 to 33% by weight and a volatile solvent concentration of 0.5% to 1.5% by weight. It will be appreciated by those skilled in the art that these matrix concentrations may be varied by the formulation of the matrix or method of application. The solid content of the resin system in the dip pan is monitored by periodically checking the specific gravity which is $1.050 +/- 0.010$. The finished product is immediately stored in a $-10°$ F. to $0°$ F. freezer. The shelf life for this prepreg at storage is approximately three plus months. The out-time at room temperature is about 24 hours.

Other preferred embodiments of the invention involve the use of thermoplastic materials to provide the matrix. Thermoplastic materials including, but not limited to, polycarbonates, polyetherimides, acrylics and polyurethanes are provided in sheet form with a thickness of 10 to 30 mm. These sheets are cut to the proper size and used directly in the commercially available form. In this embodiment of the invention the thermoplastic sheets are then used to sandwich the fabric reinforcement and, without further preparation, the thermoplastic sandwich is placed in the mold. However it is to be appreciated that the thermoplastic reinforcement combination may be stored in the sandwich configuration for an indefinite period. Further the combination of reinforcement fabric and thermoplastic sheets may be rolled at an elevated temperature to form sheets of thermoplastic composite material. These sheets may then be stored until ready for use in manufacturing.

Figure 4:
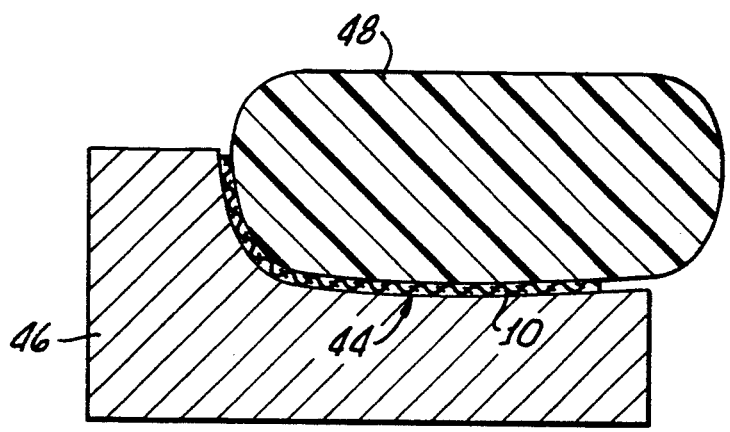
FIG. 4 is a cutaway view of the mold showing the mold faces by means of which pressure can be applied to the composite material to the present invention.

The preferred process for producing a finished part from the polymer resin impregnated fabric utilizes a molding techniques. Referring to FIG. 4 the male mold side 46 has a face 44 of hard tooling such as aluminum or steel and the female side 48 is soft tooling such as silicon or polyurethane pressure bag. Thermoplastic sandwiches, sheets of thermoplastic composite material or prepreg are cut to the dimension of the mold and to a length equivalent to the length of an arbitrary number of ganged molds. The selected material 10 is then placed between the two mold faces with the reinforcement fabric oriented so its anisotropic properties will be expressed as desired in the finished composite structure. The selected material is then pressed at an appropriate temperature and pressure for an effective amount of time. Shaped composite materials having anisotropic properties are then removed from the mold.

Figure 5:
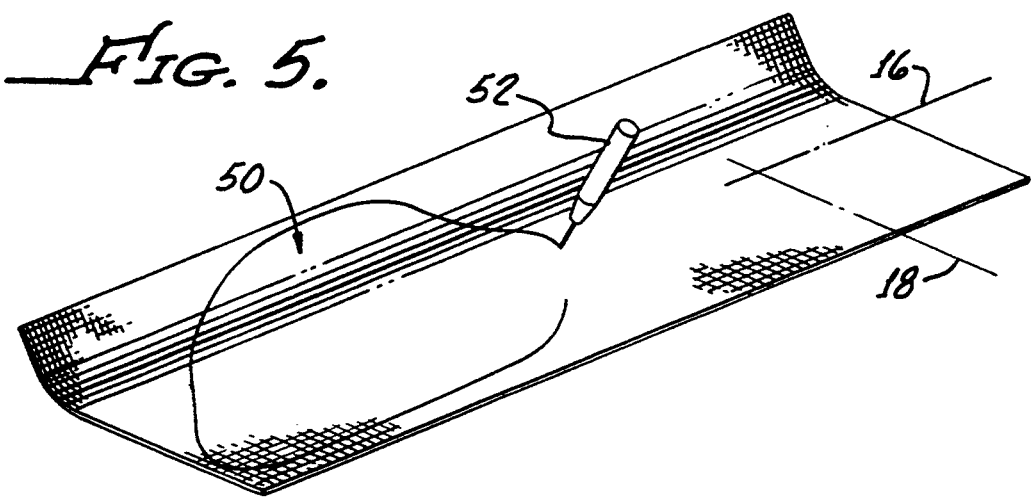
FIG. 5 shows the shaped composite blank being cut to produce the final piece.

As is seen in FIG. 5 the desired part 50 is cut from the composite material using conventional methods including water jet cutting 52. The longitudinal axis 16 and transverse axis 18 of the reinforcement material are clearly exhibited in the composite material.

Figure 6:
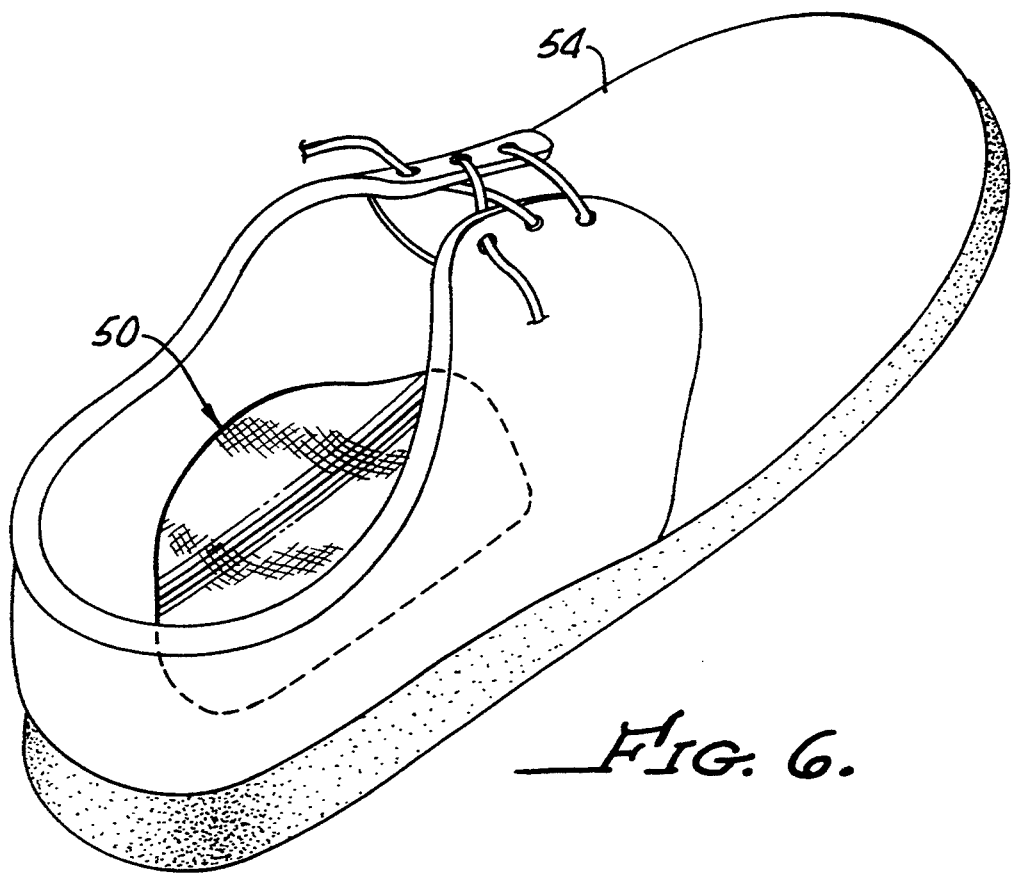
FIG. 6 shows the final production piece in place as a support arch in a shoe.

FIG. 6 shows the finished composite structure 50 being used as an arch support in a shoe 54 to absorb and distribute the forces generated by walking. In distributing forces on the foot such a support will provide the desired stiffness along the longitudinal axis while allowing increased flexibility along the transverse axis.

EXAMPLE 1

A thermosetting resin composite arch support for use in a shoe was fabricated as follows.

Several square yards of novel fabric reinforcement was manufactured using glass rovings and graphite tows. The graphite fiber used for the warp yarn was 12K GP 0.8% min. (Thornel T300 or Hercules AS4C provided by Amoco Corp. and Hercules Corp respectively). This warp yarn was then interlaced with filling yarn consisting of 330 roving E-glass (Fiberglas, Owens Corning). The resulting fabric had a final yarn count of 13 warp fibers per inch and 11 fill fibers per inch. For this embodiment the glass and graphite fabric was woven using a 2/2 twill weave pattern. This specific weave and fiber content gave the fabric a nominal weight of 31.9 oz/yd$^2$ A single-ply of the resulting fabric had a dry thickness of 0.034 inches using an Ames gauge and 0.032 inches at 60% fiber volume.

This exemplary resin formulation is begun by placing an amount of diglycidyl ether of bisphenol F (LY 9703, Cibia-Geigy) equal to 5.17 parts by weight into a reactor with mechanical mixing blades. Polyoxyalkyleneamine (Jeffamine T5000, Texaco Corp.) equivalent to 2.58 parts per weight was then slowly added and mixed with the LY 9703. The mixing temperature was kept below 80° C. Bisphenol A-Novolac Epoxy (SU-3, Rhone-Poulenc) was preheated in an oven at 70° C. for a few hours until it could be easily poured. Following the heating the SU-3 was then added in an amount equivalent to 23.26 parts into the reactor with good mixing. Two types of carboxyl terminated butadiene-acrylonitrile were then added at 2.71 parts each (CTBN 1300×13 and 1300×18 both from B.F Goodrich). This was followed by 2.33 parts of carboxylated nitrile rubber (Hycar 1472 solution [15% in MEK] from B.F. Goodrich) which was added to the reactor with continuous mixing. The mixture was heated for 60 minutes at 80° C. The batch was then cooled to 40° C. and Polyglycidyl ether of bisphenol A (Der 661 80A, 80% Der 661 in acetone) was then added to the mixture in an amount equivalent to 54.26 parts. Finally 1.0 pph $TiO_2$ (Ti-pure R-900 from Dupont Inc.) and 0.003 pph Antifoam 1400 (Dow Corning) were added. The total mixture was stored at a cool area for further compounding.

Just prior to the making of prepreg, acetone was charged into the above mixture to make it a 65–70% total solids mixture. The catalysts Dicyandiamide and EMI 24 were added with good mixing for 15 to 20 minutes and the mixing temperature was kept below 50° C.

The fabric cloth described in this example was then installed onto the fabric let-off roll 20 of the apparatus shown in FIG. 3. The resin system 26 was charged into the dip pan 24 under the vertical drying ovens 30 (towers). Under proper tension maintained by a series of rollers the fabric cloth was slowly pulled through the dip pan, and up through the drying towers 30. The wetted reinforcement was then passed over a chilled roller 32 and through an accumulator rack 34 before it reached the final product take-up roll 40 as seen in FIG. 3.

The temperature in both towers was 100° C. with the run speed of 7 feet per minute. These processing conditions produced prepreg with resin content in the range of 26 to 33% by weight and a volatiles content of 0.5% to 1.5%. The solids content of the resin system in the dip pan was monitored by periodically checking the specific gravity which is 1.050+/−0.010. The finished product was immediately stored in a −10° F. freezer. The shelf life was approximately three plus months. The out-time at room temperature was about 24 hours.

Impregnated with resin, the fabric was now cut into strips with dimensions of 4¼" by 22". These pieces of impregnated fabric were large enough to cover the face of the molds. The press mold itself had a male side constructed of steel and a female side of soft, silicone tooling. The mold faces were brought together and pressure was applied at 50 pounds per square inch. Mold temperature was maintained at 350° F. as the part was cured for two minutes. Alternatively, the mold temperature could be maintained at 300° F. while the part was cured for three minutes. Both sets of parameters gave products with satisfactory properties. Following this, the mold was separated and the cured fabric strip removed. The finished part was then cut from the fabric blank using a conventional water jet cutting apparatus.

Table 2 lists some of the properties inherent in the composite material fabricated according to the example above.

TABLE 2

| | |
|---|---|
| Tensile Strength (ksi) | 57 |
| Tensile Modulus (msi) | 6.1 |
| Tensile Strain (%) | 2.14 |
| Flexural Strength (ksi) | 56 |
| Flexural Modulus (msi) | 5.5 |
| Flexural Fatigue Modulus (msi) (After 1 Million Cycles) | 5.0 |
| Flexural Fatigue Strength (ksi) (After 1 Million Cycles) | 44 |

1. The panel was a single ply of material tested in the direction of the graphite fibers.
2. Resin Content 28–30% by weight.

EXAMPLE 2

The graphite glass reinforcement was made as described above and cut to predetermined sizes. A piece of the reinforcement fabric described in example 1 was sandwiched between two polycarbonate thermoplastic sheets (Lexan from General Electric Plastics) 15 mm in thickness. The sandwich was then placed inside steel molds which were then heated to 550° F. The mold was also kept under pressure at 100 psi. These conditions were maintained for a period of three minutes. The parts were cooled to ambient temperature and then were removed from the mold. The part was then trimmed to the final shape by conventional methods, such as water jet cutting.

Having thus described exemplary embodiments of the present invention, it should be noted by those skilled in the art that the disclosures herein are exemplary only and that alternative, adaptations, and modifications may be made within the scope of the present invention. Accordingly, the present invention is not limited to the specific embodiments illustrated herein.

We claim:

1. An anisotropic structural composite comprising:
   at least one ply of an anisotropic woven fabric reinforcement comprising a first plurality of glass weft elements interlaced with a second plurality of graphite warp elements; and,
   a matrix wetting said at least one woven fabric reinforcement wherein said matrix is hardened to provide an anisotropic structural composite which is more flexible along a first axis parallel to said first plurality of glass weft elements than along a second axis parallel to said second plurality of graphite warp elements.

2. The anisotropic structural composite of claim 1 wherein said matrix is selected from the group consisting of thermosetting resins, thermoplastic resins and combinations thereof.

3. The anisotropic structural composite of claim 2 wherein said matrix is a thermosetting resin and said thermosetting resin is selected from the group consisting of epoxy resins, polyester resins, acrylic resins, and polyurethane resins.

4. The anisotropic structural composite of claim 2 wherein said matrix is a thermoplastic resin and said thermoplastic resin is selected from the group consisting of polyetherimides, polyurethanes, polycarbonates and acrylics.

5. A process for forming an anisotropic shaped composite structure comprising;
   providing at least one ply of anisotropic reinforcement material comprising a first plurality of glass weft elements interlaced with a second plurality of graphite warp elements;
   wetting said at least one ply of anisotropic reinforcement material with a resin matrix; and
   shaping the anisotropic reinforcement material wetted with the resin matrix to provide an anisotropic shaped composite which is more flexible along a first axis parallel to said first plurality of glass weft elements than along a second axis parallel to said second plurality of graphite warp elements.

6. The process of claim 5 wherein said shaping step is accomplished by simultaneously applying heat and pressure.

7. The process of claim 6 wherein said pressure is applied in a mold having a rigid male face and a compliant female face opposite thereto.

8. The process of claim 7 wherein the male face is a metal or metal alloy and the female face is silicone or a polyurethane gas pressure bag.

9. The process of claim 5 wherein said matrix is selected from the group consisting of thermosetting resins, thermoplastic resins, and combinations thereof.

10. The process of claim 9 wherein said matrix is a thermosetting resin and said thermosetting resin is selected from the group consisting of epoxy resins, polyester resins, acrylic resins, and polyurethane resins.

11. The process of claim 9 wherein said matrix is a thermoplastic resin and said thermoplastic resin is selected from the group consisting of polyetherimides, polyurethanes, polycarbonates and acrylics.

12. The process of claim 5 wherein said anisotropic shaped composite structure comprises a single ply of anisotropic reinforcement material.

13. The process of claim 5 wherein said anisotropic shaped composite structure comprises a plurality of plies of anisotropic reinforcement material.

14. An anisotropic structural composite comprising:
   a single ply anisotropic woven fabric reinforcement comprising a first plurality of glass weft elements interlaced with a second plurality of graphite warp elements; and a matrix wetting said single ply woven fabric reinforcement wherein said matrix is hardened to provide an anisotropic structural composite which is more flexible along a first axis parallel to said first plurality of glass weft elements than along a second axis parallel to said second plurality of graphite warp elements.

15. A composite shoe arch comprising:
a first plurality of glass weft elements interlaced with a second plurality of graphite warp elements to form at least one ply of a fabric reinforcement, said at least one ply of fabric reinforcement being wetted with a resin matrix and shaped to provide an anisotropic shoe arch which is more flexible along a first axis parallel to said first plurality of glass weft elements than along a second axis parallel to said second plurality of graphite warp elements.

16. The composite shoe arch of claim 15 wherein said first plurality of glass weft elements are selected from the group consisting of rovings, yarns and fibers.

17. The composite shoe arch of claim 15 wherein said second plurality of graphite warp elements are selected from the group consisting of tows, yarns and fibers.

18. The composite shoe arch of claim 15 wherein said first plurality of glass weft elements are E-glass rovings.

19. The composite shoe arch of claim 15 wherein said second plurality of graphite warp elements are selected from the group consisting of standard modulus carbon fibers and intermediate modulus carbon fibers.

20. The composite shoe arch of claim 19 wherein said second plurality of graphite elements are standard modulus carbon fibers with a tensile modulus of 30 msi to 38 msi and a tensile strength of 500 psi to 600 psi.

21. The composite shoe arch of claim 19 wherein said second plurality of graphite elements are intermediate modulus carbon fibers with a tensile modulus of 40 msi to 45 msi and a tensile strength of 650 psi to 785 psi.

22. The composite shoe arch of claim 15 wherein said first plurality of glass weft elements have a yarn count within the range of 5 to 30 strands per inch.

23. The composite shoe arch of claim 15 wherein said second plurality of graphite warp elements have a yarn count within the range of 5 to 30 strands per inch.

24. The composite shoe arch of claim 15 wherein said woven reinforcement has a weave selected from the group consisting of plain weave, twill weave and satin weave.

25. The composite shoe arch of claim 15 wherein said resin matrix is selected from the group consisting of thermosetting resins, thermoplastic resins and combinations thereof.

26. The composite shoe arch of claim 25 wherein said resin matrix is a thermosetting resin and said thermosetting resin is selected from the group consisting of epoxy resins, polyester resins, acrylic resins, and polyurethane resins.

27. The composite shoe arch of claim 25 wherein said resin matrix is a thermoplastic resin and said thermoplastic resin is selected from the group consisting of polyetherimides, polyurethanes, polycarbonates and acrylics.

28. The composite shoe arch of claim 15 comprising a plurality of plies of woven fabric.

29. A composite shoe arch comprising:
a first plurality of glass weft elements interlaced with a second plurality of graphite warp elements to form a single ply fabric reinforcement, said single ply fabric reinforcement being wetted with a resin matrix and shaped to provide an anisotropic shoe arch which is more flexible along a first axis parallel to said first plurality of glass weft elements than along a second axis parallel to said second plurality of graphite warp elements.

30. The anisotropic structural composite of claim 1 comprising a plurality of plies of anisotropic woven fabric reinforcements.

* * * * *